INVENTOR.
HARRIS A. STOVER

BY Moody & Anderson

AGENTS

INVENTOR.
HARRIS A. STOVER
BY
Moody & Anderson
AGENTS

United States Patent Office 3,298,027
Patented Jan. 10, 1967

3,298,027
DIGITAL AUTOMATIC DIRECTION FINDING SYSTEM
Harris A. Stover, Cedar Rapids, Iowa, assignor to Collins Radio Company, Cedar Rapids, Iowa, a corporation of Iowa
Filed Sept. 8, 1964, Ser. No. 394,973
9 Claims. (Cl. 343—117)

This invention relates generally to automatic direction finding systems and more particularly to an automatic direction finding receiver employing a continuously rotating antenna system and employing phase modulation techniques in a manner such that the direction of arrival of a received signal is determined digitally.

ADF systems known in the art employ techniques for measuring phase relationships wherein the ultimate phase measurement is based on an amplitude comparison technique. These systems are vulnerable to amplitude modulated noise which may appear in the received signals. Phase measuring techniques based on the comparison of the phase between sinusoidal waveforms are limited in accordance to the extent that the waveforms are free of distortion and are further rendered inaccurate due to errors which may occur in resolving techniques employing electromechanical devices.

The object of the present invention is the provision of an automatic direction finding receiving system operable to receive a standard radio station transmission and to employ phase measuring techniques to determine station bearings which are not dependent upon amplitude modulation characteristics.

The invention is featured in the provision of a receiving system employing phase modulation of the received signal by antenna switching at the receiving site in a manner such that directional information is contained in a second phase modulation of that instituted by antenna switching, the second phase modulation being caused by a rotational antenna system.

The invention is featured further in the provision of an automatic direction finding system in which phase information indicative of direction between transmitting site and receiver is conveyed in digital form and wherein digital techniques are employed to read out the bearing between the transmitter and the receiver on a counter.

A still further feature of the present invention is the provision of a digital phase measuring technique wherein a received signal is operated upon to include a digital phase modulation characteristic which is detected by keyed or matched filter techniques and wherein all information is then derived by digital techniques based upon the determination of the retardation or advance of phase as compared to a reference phase. As such, the received system need not determine the extent of a phase shift on a sinusoidal basis as in known systems but need only determine whether a particular phase of an interval of a received signal leads or lags.

A still further feature of the present invention is the provision of an automatic direction finding receiver which utilizes phase modulation techniques derived from a non-directional antenna system such that the receiver may be employed for amplitude modulation reception during direction finding.

These and other objects and features of the present invention will become apparent upon reading the following description in conjunction with the accompanying drawings in which:

The present invention might best be comprehended by a consideration of the operating principles involved with emphasis on the geometry of the antenna system and the general switching techniques employed.

Figure 1:
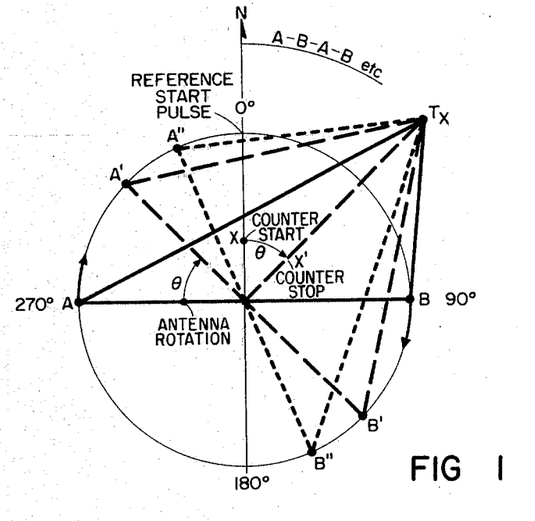
FIGURES 1 and 2 are diagrammatic representations of the operating principles of the invention.

With reference to FIGURE 1, an antenna system is illustrated which is comprised of antennas A and B. The antennas are displaced in space and rotated about a midpoint between them. Assuming that antennas A and B are stopped in the position illustrated, the perpendicular bisector of the line between the antennas is seen to be oriented with a reference azimuth which, in FIGURE 1, is depicted as 0° or north. It is apparent from the geometry that a received signal arriving from 0° or 180° will arrive at both antennas A and B with the same phase. If a received signal arrives from any direction other than 0° or 180° there will be a shift in the phase of the signals received by antennas A and B because of the difference in propagation path lengths. The present invention utilizes this shift in phase to determine the direction of arrival of the received signal.

Considering the invention in its basic form, let it be assumed that there is a switching system associated with antennas A and B which switches the output from the antennas alternately to a receiver. The antenna system rotates in a clockwise manner as shown. Let it be assumed further that, if the antenna is in the position shown in FIGURE 1, that a switch is closed and starts a counter which counts degrees until a further impulse stops the counter. This switching system would be associated with the antenna system and provides a referenced pulse whenever the rotating antenna system passes a location where antenna B is directly to the right of the antenna A as indicated in FIGURE 1. For purposes of example, let it be considered that the switch alternately connecting the output of the antennas A and B to a receiver switches antenna A to the receiver during the first half of each rotational degree, and antenna B to the receiver during the second half of each rotational degree. Let is be further assumed that a still further switching means provides a pulse in time correspondence with each degree of rotation of the antenna system. By applying the proper phase detectors and a counter to the above generally defined system, the basic requirements of a digital ADF system in accordance with the present invention are realized.

A further consideration of the antenna system, as depicted in reference position in FIGURE 1, indicates that when a signal arrives at the receiving site from a direction between 0° and 180° (FIGURE 1), the relative phase of the signal as received by antenna B leads that received by antenna A due to the geometry defining the transmission paths. Thus, when the receiver is switched from antenna A to antenna B, an advance in phase of the received signal is experienced. By contradistinction, when a received signal arrives between 180° and 360°, the phase of the signal received by antenna A leads that received by antenna B and when the receiver is switched from antenna A to antenna B there is a retardation in phase of the received signal. In each instance, the reverse is true when switching from antenna B to antenna A.

The distance between antennas A and B is a small portion of a wavelength at the operating frequency and the amount of phase deviation experienced is small. Thus, a considerable carrier component will exist at the receiver which is sufficient for a phase tracking loop to track so as to develop a reference phase from which the phase advances and retardations may be detected.

FIGURE 1 illustrates a hypothetical example of a transmitter located at a point $T_x$ which is $\theta$ degrees from the reference azimuth. The antennas A and B are oriented at the reference position so that the perpendicular bisector of the line between the antennas passes through the reference azimuth at 0°. A start pulse will be generated when the antenna system reaches this reference position, and the start pulse will cause a counter to start counting increments corresponding to the assumed 0.5° increments which define the switching of the antennas A and B to the receiver.

Logic circuitry to be further discussed will cause the counter to start counting at 0°, since the transmitter location $T_x$ lies between 0° and 180° or to the right of the perpendicular bisector of the antennas A and B at the reference position. As the antenna system rotates in a clockwise position from the reference position shown, the switching system alternately connects antennas A and B to the receiver such that the received signal is comprised of predetermined intervals of reception from each of the antennas A and B in an alternate fashion. When the antenna system rotates clockwise by an angle $\theta$ it is noted that the distances between the transmitter $T_x$ and the antenna positions A' and B' are equal. At this point the perpendicular bisector between the antennas passes through the transmitter source at $T_x$ and it is noted that the phase of the signals received from antennas A and B is the same. Further rotation of the antenna system to the antenna positions of A'' and B'' is noted to establish a geometry such that the signal received from antenna A now leads that from antenna B rather than lags and the signal from antenna B now lags that received from antenna A, which is a reverse of the situation occurring between the reference position and the rotation to $\theta°$. This rotational position, defined by the perpendicular bisector between the two antennas passing through the transmitter site, effects a phase transition in the received signal. Logic circuitry to be further determined detects this phase transition by recognizing the reception of the two successive received intervals during which there is no reversal in phase. A stop pulse is generated to stop the counter at the phase transition point such that the counter, starting at 0° counts during the interval X to X' and displays the relative angle between the transmitter location $T_x$ and the reference as $\theta°$.

Figure 2:
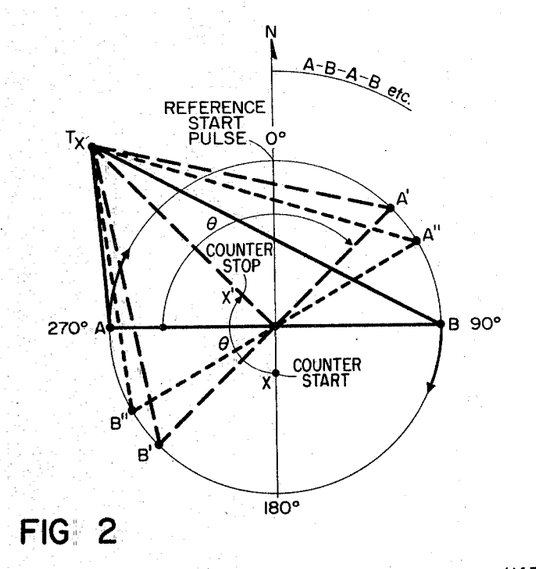

FIGURE 2 represents a receiving system geometry wherein the transmitter location $T_x$ is located between 180° and 360°, or to the left of the perpendicular bisector of the line between the antennas A and B. For this situation it is noted that, when the antennas A and B reach the reference position, a reference start pulse is generated to start the counter; however, switching logic is employed such that the counter starts at 180° and counts towards 360°. Thus the counter is shown diagrammatically as starting a count from 180° at the point X, at which time antennas A and B are in the reference position. The count is effected until the above-defined phase transition is again experienced, which transition occurs at a rotational angle $\theta$ from the reference position such that the antennas A and B are rotated to positions A' and B' respectively. When the phase transition is encountered, logic circuitry again detects the phase transition and causes a stop pulse to stop the counter when it has countered $\theta°$ from its starting point of 180°. It is noted from the geometry of FIGURE 2, that the counter will then display the relative angle of the transmitting source $T_x$ with respect to the reference as $(180°+\theta)$ which is the relative angle measured clockwise from the reference to the direction of the transmitter at $T_x$. Antenna locations A'' and B'' are included in FIGURE 2 to illustrate that the relative phases of the signal as received by the antennas A and B experience a reversal on either side of the phase transition point defined by antenna locations A' and B'.

The manner in which the logic is developed to start and stop the counter will be further described with reference to an embodiment of the system. It is to be emphasized at this point in the description that the antenna geometry in conjunction with a predetermined rotation of the antennas about a fixed reference and together with an alternate switching of the received signal from antennas A and B to the receiver, presents to the receiver a phase-modulated signal which is phase-modulated at the antenna switching rate as successive intervals of signal which are retarded and advanced with respect to a reference phase, and which is further phase-modulated by the variation in the distance between the receiving antennas caused by the rotation of the antenna system. The incoming signal as applied to the receiver is therefore phase-modulated in a digital fashion, and the receiving technique is based on the detection of the direction of phase shift of the digital intervals with respect to a reference phase, and is not dependent upon the extent of the phase shift. The receiver embodiment to be described, therefore, advantageously employs a keyed filtering technique. Since the receiver system now establishes a sequence of information bits with a rate defined by the antenna rotation rate, wherein the bits are in the form of opposite phase shifts of the received carrier as compared to a reference phase, the entire system becomes a digital system operating at a bit rate defined by the rate of switching between antennas A and B. The receiver starts a digital counter at a predetermined reference azimuth as concerns the rotating antennas, and monitors the alternate phase shifts of the reception interval from antennas A and B until such a time as the perpendicular bisector between antennas A and B passes through the transmitter site, at which time a phase transition is encountered and appropriate logic is employed to stop the counter.

The manner in which the above-defined operational characteristics may be achieved will now be discussed with respect to a receiver embodiment as functionally depicted in FIGURE 3.

Figure 3:
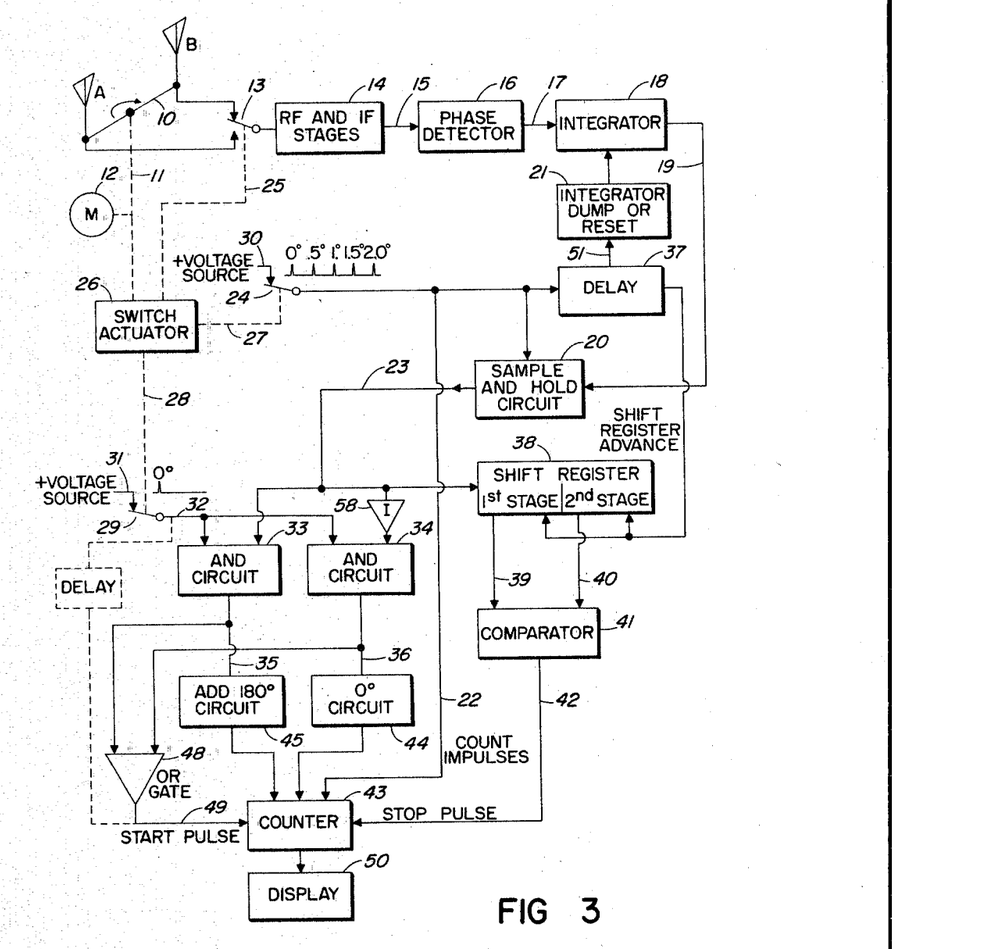
FIGURE 3 is a functional diagram of an automatic direction finding receiver in accordance with the present invention.

FIGURE 3 illustrates the antennas A and B mounted upon a mounting member 10 which is caused to rotate about its midpoint axis 11 by means of mechanical drive from a motor 12. A first switch 13 is connected between antennas A and B, and the R.F. and I.F. stages 14 of the receiver, and through a positioning link 25 with switch actuator 26, alternately connects antennas A and B to the receiver stages 14. Switch actuator 26 is indicated as being mechanically positioned in accordance with rotation of motor 12. The positioning of switch 13, so as to effect the alternate antenna detection, is functionally represented, it being realized that numerous expedients might be employed such that switch 13, during the rotation of the antennas effects alternate connection of the antenna outputs to the receiver 14 and, for the purpose of the example to be considered here, it will be assumed that this interconnection is effected for each one-half degree rotation of the antennas A and B. It will be further assumed that the switch 13 is effectively driven in response to antenna rotation such that antenna A is first connected to the receiver 14 at a reference position of the antennas A and B and thereafter for succeeding alternate half-degree rotational increments. Reference is made to waveform $a$ of FIGURE 4 which indicates diagrammatically the input to receiver 14 as being alternately that from antennas A and B beginning with antenna A at the 0°, It is noted that antenna B is accordingly connected to the receiver 14 during the last one-half degree rotation of the antenna system prior to the reference position.

A second switch 24 positioned by means of interlink 27 with switch actuator 26 might operate in conjunction with a positive voltage source 30 to develop a train of pulses in time coincidence with each one-half degree increment of antenna rotation.

A third switch 29 operates in conjunction with an interlink 28 to switch actuator 26 to develop, in conjunction with a positive voltage source 31, a further train of pulses 32 which occur for the duration of the first half degree rotational increment following the reference antenna position.

Figure 6:
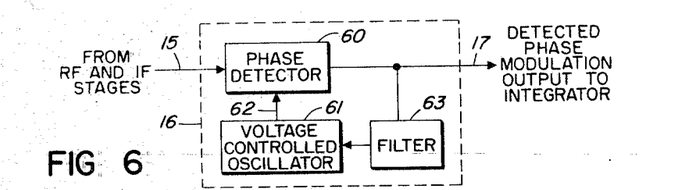
FIGURES 6, 7, 8, 9 and 10 are operational diagrams of certain of the functional blocks of the embodiments of FIGURES 3 and 5.

The output from the receiver R.F. and I.F. stages 14 is applied to a first phase detector 16 which consists of a closed tracking loop which is effective in tracking the carrier component of the incoming signal which is phase modulated by the antenna system. This carrier component reference is then used to demodulate the phase modulated signal 15 and provides a positive output 17 when the phase is retarded with respect to the reference and a negative output when the phase is advanced with respect to the reference. Reference is made to FIGURE 6 which illustrates phase detector 16 as being comprised of a phase detector 60 receiving the incoming signal 15. The output of phase detector 60 is applied through a filter 63 to control the frequency and phase of a voltage controlled oscillator 61 which tracks the incoming carrier frequency and produces an output 62 as a second input to phase detector 60 in the form of a signal having a frequency corresponding to the incoming carrier frequency and phase shifted 90° with respect thereto. The output 17 thus contains the phase modulation information in the incoming signal due to antenna switching that is subsequently to be used in azimuth detection.

Figure 4:
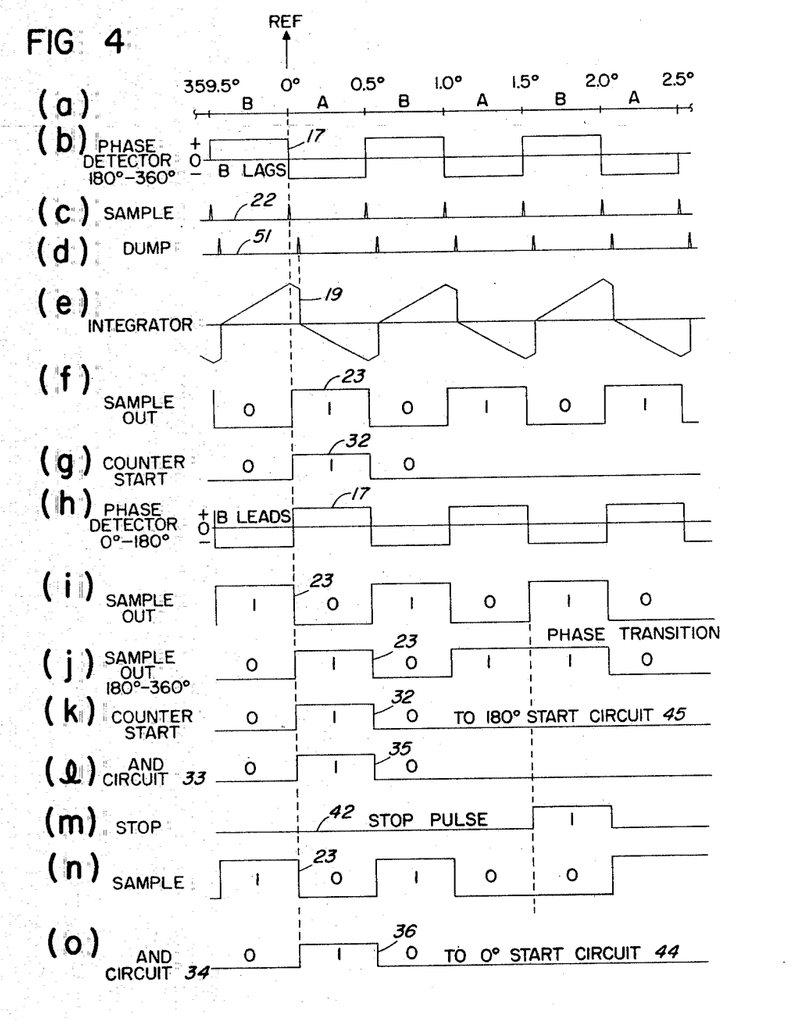
FIGURE 4 is a diagrammatic representation of the operational waveforms of the embodiment of the invention.

Reference is made to waveform *b* of FIGURE 4 wherein the output 17 from phase detector 16 is indicated as an alternate series of positive and negative pulses corresponding to the reception intervals from the antennas A and B. Waveform *b* represents the form of the output 17 when the direction of the incoming signal is between 180° and 360°—i.e., coming from the left of the perpendicular bisector line between antennas A and B when the antennas are in the reference position (see FIGURE 2). FIGURE 2 indicates that the phase of the signal from antenna A under this condition is advanced with respect to the reference while that from antenna B is retarded.

A first step in azimuth determination is to convert the output from phase detector 16 to digital information for further processing. As previously discussed, the detection technique is based upon the determination of whether a particular reception interval includes a signal which leads or lags a reference phase. The extent of the phase advances and retardations is not to be taken into consideration—only the direction of phase shift. Accordingly, the output from phase detector 16 is applied to an integrator 18 where it is integrated for the length of time that the antenna is making one-half degree of rotation. The stream of pulses 22 from switch 24, occurring at each one-half degree increment of the antenna rotation, is applied to a sample and hold circuit 20 which samples the output 19 from integrator 18 and holds it. The pulses 22 are applied through delay means 37 to develop a stream of delayed pulses 51 which are connected to an integrator dump or reset circuitry 21 which effects a reset of the integrator to zero at the time occurrence of each pulse 51 and prepares the integrator for the next one-half degree rotation period.

Reference is made to waveforms *c, d, e* and *f* of FIGURE 4 wherein the pulses 22 from switch 24 are indicated as occurring at the beginning of each one-half degree antenna rotational increment. Waveform *d* illustrates the output from the delay means 37 in the form of pulses 51 which occur a slight time after the occurrence of each of the pulses 22. Waveform *e* represents the output of integrator 18 to which the output 17 from phase detector 16 is applied. Integrator 18 develops an output 19 in the form of the integral of waveform 17. Thus, integrator 18 builds up in a positive direction when the output from phase detector 17 is positive and in a negative direction if waveform 17 goes negative until such a time that a reset or dump pulse 51 occurs to reset the integrator to zero. The integrator then builds in a negative direction for the succeeding one-half degree antenna rotational increment. The delay between the pulses 22–51, as indicated in waveforms *c* and *d*, is exaggerated for illustrative purposes. This delay need only be sufficient to enable a sample to be made of the integrator output waveform 19 at the time occurrence of each of the pulses 22, after which time the reset or dump pulse resets the integrator to zero so that it may build up in the appropriate direction for the ensuing one-half degree increment.

Waveform *f* of FIGURE 4 illustrates the output 23 of the sample and hold circuit 20. Output 23 is digital in nature and is thus indicated in digital fashion as being a series of bits corresponding to "0" or "1" in the binary system. The function of the sample and hold circuit is that of sampling the output of integrator 18 during each one-half degree increment, detecting the polarity of the sample, and holding the polarity in the form of a corresponding digital output for the following one-half cycle increment. It is noted, therefore, that the pulse 22 of waveform *c* occurring at 0° samples the positive integrator output 19 occurring during the last half degree of antenna rotation prior to the reference and the output 23 from the sample and hold circuit 20 is a binary "1" during the first one-half degree of rotation beyond the reference. In like fashion, the integrator output between 0 and 0.5° is negative such that the output from sample and hold circuitry 20 is a binary "0" for the following one-half cycle increment.

*Counter start logic*

The output from the sample and hold circuitry 20 is employed along with the counter start pulse 32 from switch 29 to determine whether the counter of the invention starts its count at 0° or 180°. In the first half-degree of antenna rotation past the reference azimuth of 0°, switch 29 provides an impulse which is effective in starting the counter. This impulse is indicated as waveform *g* of FIGURE 4 and is seen to be a binary "1" which is held for the first half degree of antenna rotation following the reference at 0°. The counter start logic compares this pulse with the output of the sample and hold circuit 20 occurring at this interval to determine whether the counter starts at 0° or 180°. In essence, the counter start pulse 32 is compared with the output 19 of integrator 18 which occurred during the last half-degree increment of antenna rotation prior to the reference position. The comparison, then, is seen to be dependent upon whether the phase of the received signal during this last half degree of antenna rotation was an advance or retardation as compared to the reference phase. If the signal is received from a direction between 180° and 360°, the output of the phase detector 16 is positive between 359.5° and 0°, since reception during this interval is from antenna B and the propagation path geometry determines that the phase is accordingly retarded as compared to the reference phase. This phase retardation occurs as a binary "1" bit at the output of sample and hold circuit 20 during the first half degree of antenna rotation past the reference of 0°. Thus, with respect to FIGURE 4, should the output 23 from sample and hold circuit 20 (waveform *f*) be a binary "1," the output is like that of the counter start pulse 32. Reference to FIGURE 3 indicates that the output 23 from the sample and hold circuit is applied along with start pulse 32 to an AND circuit 33 such that AND circuit 33 develops an output 35 which may be utilized in starting the counter from a starting count of 180°. The condition is represented diagrammatically in waveforms *j, k* and *l* of FIGURE 4 wherein the binary "1" bit of output 23 from the sample and hold circuit and the counter start pulse 32 develop an output 35 from the AND gate 33 in the form of a binary "1" pulse.

Should the signal be received from between 0° and 180°, the output from sample and hold circuit 20 is additionally applied through an inverter 58 to an AND gate 34 to which the counter start pulse 32 is applied as a second input. An output 36 is developed which is instrumental in starting the count from 0°. Reference is made to FIGURE 4 wherein waveform *h* indicates the output from phase detector 17 wherein the signal received from antenna B in the last half degree of antenna rotation before the reference position of 0° leads the reference phase, whereupon the output from the sample and hold circuit 20 (waveform *i*) becomes a binary "0" for the interval of the first half degree of antenna rotation following the reference. The binary "0" condition of waveform *i* during the first half degree of antenna rotation following the reference is inverted and compared with the counter start pulse (waveform *k*) in the AND circuit 34 so as to develop an output 36 (waveform *o*) from AND circuit in the form of a binary "1" which is instrumental in effecting a count sequence starting from 0°.

The counter start pulses from each of the logic gates 33 and 34 might then be applied through an OR gate 48 as an input 49 to counter 43. Alternately the start pulse 49 might be taken as pulse 32 directly from switch 29 in which case a slight delay would be imparted to the pulses 32 prior to application to counter 43 as start pulses 49. The delay would assure that the counter was properly set to 0° or 180° before the start pulse 49 arrived. This later expedient is illustrated by phantom lines in FIGURE 3.

*Counting sequence and stop pulse development*

Assuming that the counter 43, in response to a start pulse 49, has started a count from either 0° or 180° in accordance with the above described logic, the counter proceeds to count 0.5° increments in the form of the pulses 22 from switch 24 which are applied as count impulses to the counter. The counter thus advances one-half degree for each half degree of antenna rotation until a stop pulse 42 is generated.

Previous discussion described the development of a stop pulse at the instant that the perpendicular bisector of the line between antennas A and B passed through the transmitter location. At the phase transition point, therefore, the alternate intervals of advanced and retarded phase signals experience a "phase inversion" such that two like periods of phase advance or phase retardation occur successively. This situation is indicated in waveform *j* of FIGURE 4 wherein a phase transition is assumed at the beginning of the third half-degree rotational increment of the antenna, that is, occurs at 1.5°. Waveform *j* thus illustrates the output from sample and hold circuit 20 under the condition that the signal is being received from between 180° and 360°. The alternate binary "1" and "0" increments are "flipped over" by 180° when the phase of the signal from antenna B, which previously was retarded as compared to the reference phase, becomes advanced at the transition point and thus appears at the output of the sample and hold circuit 20 in the form of a binary "1" bit. Waveform *n* of FIGURE 4 illustrates the output from sample and hold circuit 20 when the signal is being received from between 0° and 180°, and it is noted that the waveform is inverted from that of waveform *j* such that the phase transition at 1.5° occurs as two successive binary "0" increments.

Since the phase transition is consistently depicted as two like binary intervals in succession (either two binary "1's" or two binary "0's"), and for all other times the output from the sample and hold circuit is comprised of alternate and opposite binary bits, the output from the circuit is readily adaptable for logic processing to develop a stop pulse at the occurrence of the phase transition. For this purpose, and with reference to FIGURE 3, the output of the sample and hold circuit 20, in addition to being applied to previously described counter start logic circuitry, is applied as input to a shift register 38 comprised of two stages.

The shift register 38 is advanced in accordance with the output from delay circuit 37, which corresponds in time to the pulses 51 of waveform *d*, FIGURE 4. This arrangement allows the train of binary bits from the sample and hold circuitry to be advanced through the register 38. The outputs 39 and 40 from the first and second stages of the shift register are applied to a comparator 41 which functions to develop an output pulse 42 as a counter stop pulse at the instant that the first and second stages of the shift register 38 contain like binary bits. This condition exists only when the previously defined phase transition is encountered and reflected as successive like bit intervals from the sample and hold circuit 20.

The output from comparator 41 thus serves to stop the count at the phase transition such that the counter has counted sufficient ones of the count pulses 22 to read the azimuth of the direction of the received signal with respect to the 0° reference. Waveform *m* of FIGURE 4 illustrates such a stop impulse 42 as occurring during the time interval corresponding to the second one of the successive like bits from sample and hold circuit 20, such that the leading edge thereof corresponds time-wise to the phase transition point.

A sequence of operation has thus been defined wherein during the first half-degree following the reference position of the antennas, a 180° decision is made to determine whether the counter will start counting half-degree stages from 0° or from 180°. After the count start point is established, the counter counts one-half degree increments until the antennas rotate to a position where the perpendicular bisector of the line between the two antennas passes through the transmission source at which time the counter is stopped and the number contained in the counter corresponds to the bearing of the signal source from the reference azimuth. During the time that the counter is stopped, this reading remains on the counter 43 and might be transferred to a display 50. It is noted in the above description, that the counter is started only at the time that the antennas are in reference position. Since the perpendicular bisector of the line between the two antennas passes through the transmission source when the counter is stopped, the counter will always be stopped sometime during the first half revolution of the antennas, and will remain stopped until the beginning of the subsequent revolution from the reference position. Thus, the count will always be displayed at least for the time defined by one-half revolution of the antenna system.

Figure 7:
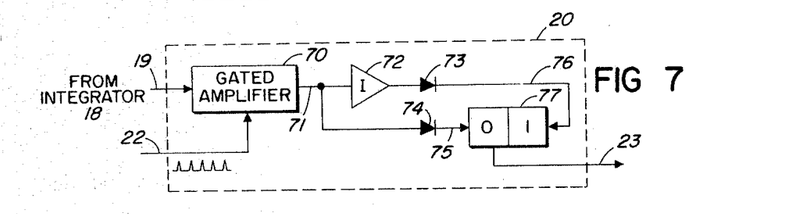

FIGURE 7 illustrates a manner in which the sample and hold circuit 20 of the invention might be embodied. The sample and hold circuit must function to sample the output of the integrator 18 at times defined by the occurrence of the count pulses 22 and hold an output corresponding in polarity to the sample during the ensuing half-degree reception period.

FIGURE 7 illustrates a means by which this function may be performed wherein the output 19 from integrator 18 is applied to a gated amplifier 70 which develops an output 71 during those intervals defined by the appearance of the count pulses 22. The output 71 from gated amplifier 70 would thus be in the form of a series of alternate positive and negative pulses occurring during each count interval and terminated by two successive positive or two successive negative pulses when the phase transition is realized and the count sequence is terminated. The output 71 from gated amplifier 70 may thus be applied through a diode 74 to the first stage of a flip-flop 77 to effect triggering thereof and through inverter 72 and diode 73 to a second stage of flip-flop 77 to effect triggering thereof. An output 23 may be taken from one of the stages of flip-flop 77 which will be in the form of a binary train of alternate binary "zeros" and "ones" terminated at the completion of a count sequence by two successive binary "zeros" or two successive binary "ones." If one defines a positive pulse from the output 71 of amplifier 70 as a binary "one" and assuming that a binary "one" applied to the binary "zero" stage of flip-flop 77 effects reset, it is noted that the output in the form of binary condition corresponding to the sample input is held for the duration of the ensuing count period.

Figures 8, 10:
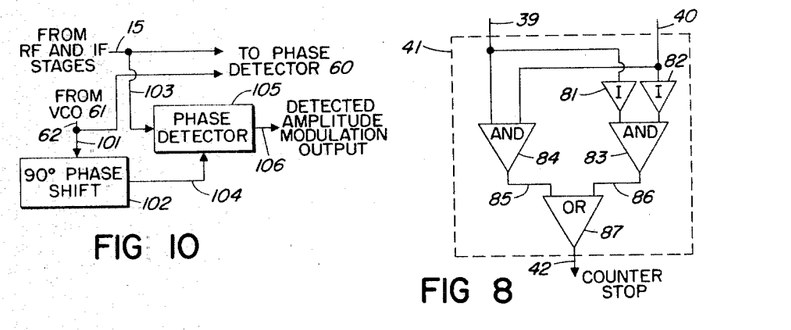

FIGURE 8 represents an embodiment of comparator 41 wherein the outputs 39 and 40 from the first and second stages of shift register 38 are applied directly to a first AND gate 84 and through inverters 81 and 82 to a second AND gate 83. The outputs 85 and 86 from the AND gates are applied to an OR gate 87 such that a counter stop output pulse 42 is developed whenever the inputs 39 and 40 are simultaneously like in nature.

Figure 9:
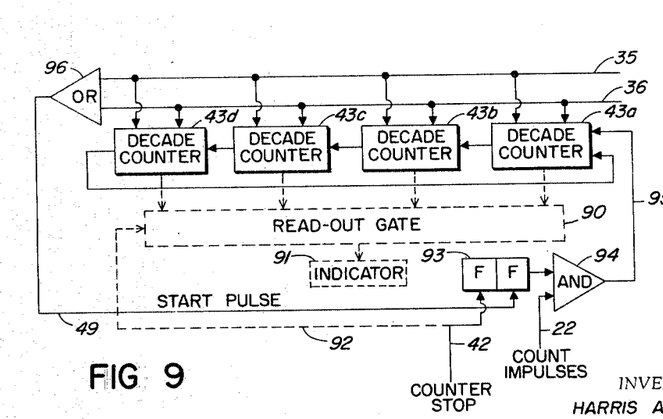

FIGURE 9 represents an embodiment of the counter 43 which includes the function of the "add 180 degree" circuit 45 and "0°" circuit 44 of FIGURE 3. FIGURE 9 illustrates the counter as being comprised of a decade counter ring comprised of four cascaded decade counters 43a–43d, each of which might comprise a four stage binary counter with appropriate feedback to modify the normal count of sixteen to a count of ten should the smallest count increment be a 0.1 degree. In the illustrated example discussed herein, the smallest count increment is 0.5° and thus counter 43a would be modified to count to two and alternately display zero and five-tenths respectively. Previous description indicating that the presence of a counter start pulse from the circuit 33 of FIGURE 3 must be effective in starting a count from 180°, while the development of a counter start pulse from the NOR/AND circuit 34 of FIGURE 3 must be effective in starting the count from 0.

The embodiment of FIGURE 9 accordingly illustrates the outputs 35 and 36 from these circuits as being applied appropriately to each of the decade counters 43a–43d, to effect a desired starting count. It is to be realized that the lines 35 and 36 would be connected as a triggering impulse to appropriate permutations of the stages within each of the decade counters such that the presence of a signal 35 would establish a count of 180.0° within the chain and that the presence of a signal 36 would establish a count of 000.0° within the counter chain. The establishment of the proper start count at the counter chain and the subsequent count sequence may be effected by applying each of the lines 35 and 36 to an OR gate 96 from which a start pulse 49 is developed. As previously discussed, the start pulse 49 might alternatively be taken as pulses 32 from antenna switch 32 to which a slight delay is imparted (see FIGURE 3). The embodiment of FIGURE 9 effects a count sequence by gating the count impulses 22 to the input of the counter chain for the interval between a start pulse and the occurrence of a stop pulse 42. This may be embodied by applying the stop pulse 42 to the first stage of the flip-flop 93 and applying the start pulse 49 to the second stage thereof. The output of the second stage of flip-flop 33 may then be applied to an AND gate 94 and be instrumental in gating the count impulses 22 through AND gate 94 as input 95 to the counter chain. The appearance of a counter stop pulse reverses the state of flip-flop 93 such that the output applied to AND gate 94 is opposite that of impulses 22 in a binary sense and thus the count impulses 22 are prevented from reaching the input to the counter chain. For the embodiment described herein a count sequence is effected once during each revolution of the antenna and, since the longest possible count is completed in one-half of the revolution, it is anticipated that the output count may be read directly from the counter stages 43a–43d.

An embodiment to be further described initiates two count sequences for each revolution of the antenna system wherein the count would be displayed for a comparatively short period of time and readout means in conjunction with an indicator, such as indicated in phantom lines in FIGURE 9, would advantageously be employed.

Figure 5:
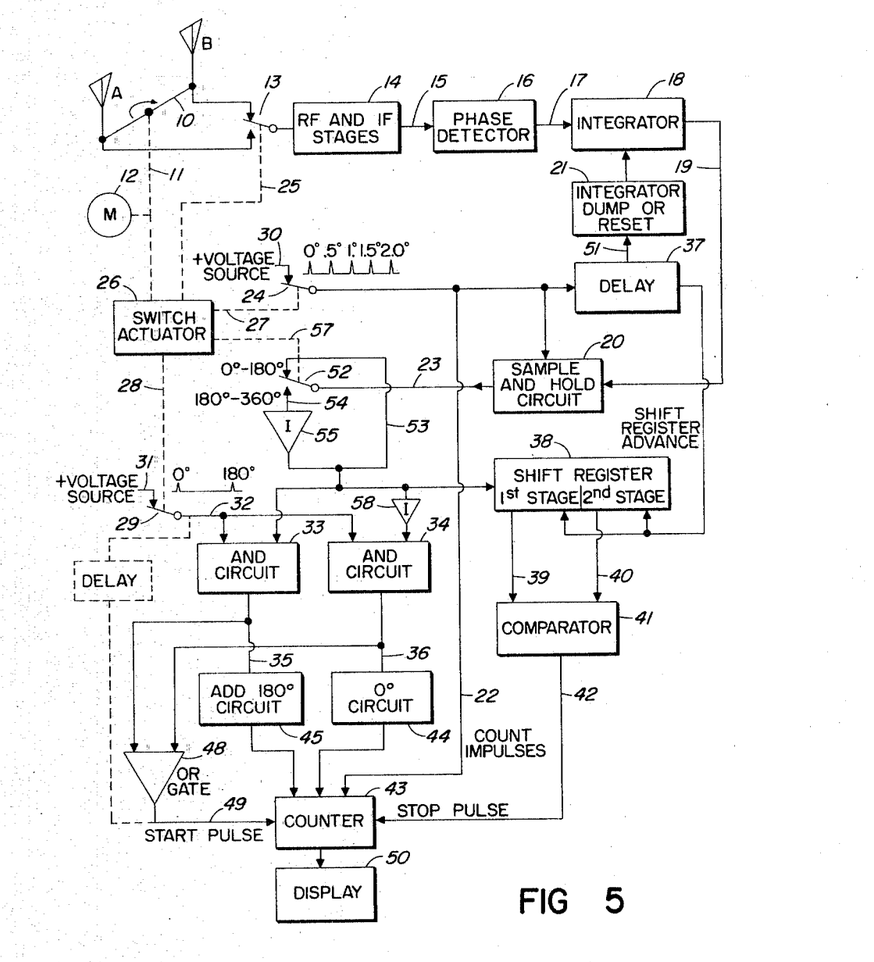
FIGURE 5 is a functional diagram of a further embodiment of a receiver in accordance with the present invention.

FIGURE 5 represents a further embodiment of the invention wherein two azimuth count sequences may be effective for each revolution of the antenna system. The embodiment of FIGURE 3 was noted to effect but a single count sequence for each revolution of the antenna system, thus the system might be considered as utilizing but one-half of the reception time. The embodiment of FIGURE 5 provides means whereby a count sequence may be completed twice for each revolution by providing a second count start pulse corresponding to a second reference position of 180°. The system thus starts a count sequence when the antennas are in the zero degree reference position and further starts a count sequence when the antennas are in the 180° reference position; the latter being defined as the antennas A and B having rotated 180° from the zero degree reference position such that, with reference to FIGURES 1 and 2, the antenna positions A and B are interchanged.

The embodiment of FIGURE 5 is like that of the previously described embodiment of FIGURE 3 with the exception that antenna switch 29 develops counter start pulses at both 0° and 180° as concerns the antenna rotation and a further antenna switch 52, through interlink 57 with switch actuator 26, effects a reversal or 180° phase shift of the output of the sample and hold circuit 20 when the antenna is rotating from 180° to 360°. This reversal takes into consideration the reversed counter start logic which must necessarily be considered when one operates with the second reference of 180°, since the counter start logic as defined in conjunction with embodiment of FIGURE 3, was based upon the relative phase of the reception of each of the antennas during that half-degree interval preceding the reference position. The use of a new reference position 180° displaced then necessarily requires reversal in the logic employed to start the counter at the proper 0° or 180° count.

Thus, FIGURE 5 includes a further switch 52 which, during antenna rotation between 0° and 180°, applies the output 23 from sample and hold circuit 20 as before to the logic circuits 33 and 34 and shift register 38. Switch 52 applies the output from sample and hold circuit 20 through an inverter 55 to the logic circuits 33 and 34 during antenna rotation between 180° and 360°. Both the 0° and 180° counter start pulses from switch 29 effect count sequences from a proper starting point and the sequence is stopped by the development of a stop pulse 42 in a manner similar to that previously described.

Since two counts are thus effected for each antenna revolution, comparatively long count sequences would effect very short display times if the display were to be read directly. For this reason, with reference to FIGURE 9, the embodiment of FIGURE 5 would preferably employ a readout gate 90 which receives the output from each of the decade counters in the chain which is responsive to the counter stop pulse 42 through interconnection 92 to read out the count of a completed sequence to an indicator 91 such that the count effected during one of the 180° intervals would be displayed during the ensuing 180° interval, thus enabling more time for the count to be displayed to the observer.

The logic employed in the above described embodiments of the invention is based upon particular comparisons between the binary bit stream from sample and hold circuit 20 and the counter start pulses 32. Each of the above described embodiments contains an ambiguity should one assume that the direction of the received signal corresponds to either the 0° or 180° reference azimuths. The counter start logic is ineffective under this condition since at the reference position there is no phase difference between the signals received from the antennas A and B. Means might be employed to overcome this ambiguity by choosing, for example, a first reference of 0° and a second reference of 90°. In this situation, should the first count be ambiguous (assuming the signal is coming from 0° azimuth) the second count would be a true count. Since each count sequence in any event must allow for a 180° rotation increment to effect the count, it would be necessary to employ a count sequence involving more then one revolution. For example, a first revolution might effect a count from 0° reference while the succeeding revolution might effect a count from the 90° reference. A general teaching of this type of plural count sequence utilizing plural references that are other than 180° displaced is described in my copending application, Serial No. 315,899, now Patent No. 3,262,117 entitled "Digital Omnirange System of Higher Accuracy Than Existing Omnirange Systems," filed October 14, 1963.

While the embodiments described herein have used one-half degree rotational increments of the antenna system as the counting rate, it is to be understood that the invention is not so limited. Rotational increments of, for example, 0.1° might be utilized wherein the count would count 0.1° increment rather than 0.5° increments. In any embodiment the minimum count increment would be limited by the extent to which the antenna-operated switching arrangement could produce the necessary pulse output and by the extent to which the smallness of a given timing interval might hinder the integration process and the demodulation process be rendered vulnerable to noise.

FIGURE 10 illustrates a modification of the circuitry of the invention in the form of the addition of a phase shifter and a phase detector by means of which amplitude modulation on the incoming signal may be detected and the receiver may function both as a direction finder and as a conventional receiver of amplitude modulated intelligence.

FIGURE 10 illustrates the output from voltage controlled oscillator 61 of FIGURE 6 as being additionally applied through a 90° phase shifter 102 as a first input to an additional phase detector 105 which also receives the output 15 from the R.F. and I.F. stage 14 through interconnection 103. In this manner, phase detector 105 acts as a coherent mixer and produces an output 106 which contains the amplitude modulation information; for example, a voice signal, should such a modulation be present on the received signal. The receiver system of the invention, in operating on phase comparison techniques which are independent of amplitude modulation in any form, advantageously permits the additional amplitude modulation function to be included.

Although the present invention has been described with respect to particular embodiments thereof, it is not to be so limited as changes might be made as fall within the scope of the invention defined in the appended claims.

I claim:

1. A digital automatic direction finding system comprising first and second receiving antennas displaced in space upon a mounting member, means for rotating said mounting member about an axis lying at the midpoint between said antennas, receiving means, first switching means responsive to the rotation of said mounting member to switch said first and second antennas alternately at a predetermined rate to the input of said receiving means, means for developing a train of first pulses of predetermined polarity at predetermined equal rotational increments of said antennas from a reference position thereof, means for developing a second train of pulses in time coincidence with the rotation of said antennas through the first one of said rotational increments subsequent to said reference position thereof; said receiving means comprising phase detection means, bit detection means, means responsive to the output of said phase detection means to develop a binary stream of information bits corresponding to the relative phase of the received signal as compared to the average phase thereof, a digital counter receiving said second train of pulses and said first train of pulses and counting successive ones of said first train of pulses upon a pulse of said second train being applied thereto, and counter stop logic means receiving said bit stream and developing a third pulse in time coincidence with the application thereto of two successive like binary bits, said third pulse being connected to said digital counter to stop the count sequence.

2. A system as defined in claim 1 wherein said phase detection means comprises a narrow band phase tracking loop including a phase detector receiving said incoming signal as a first input thereto, the output of said phase detector being applied to said bit detection means and through filtering means to a voltage controlled oscillator, the output of said voltage controlled oscillator applied as a second input to said phase detector, the output of said voltage controlled oscillator corresponding to the carrier frequency of said incoming signal and having a reference phase 90° displaced from the average phase of said input signal.

3. A system as defined in claim 2 wherein said bit detection means comprises an integrator receiving the output of said phase detector, reset means connected to said integrator, a delay means, said first train of pulses being applied through said delay means to said reset means to effect a reset of said integrator to zero in response to the presence of each of said first pulses, sample and hold means receiving the output of said integrator and said first pulses as respective inputs thereto and producing said bit stream output comprising a binary bit for each rotational increment of said antennas the state of which corresponds to polarity of the output of said integrator for the preceding one of said antenna rotational increments.

4. A system as defined in claim 3 further comprising counter start logic means receiving the output of said sample and hold circuit and said second train of pulses and effecting counter starting counts corresponding to said reference azimuth and said reference azimuth plus 180° in response to predetermined binary comparisons between said second pulses and the time correspondence ones of the binary bits from said sample and hold circuit.

5. A system as defined in claim 3 further comprising counter start logic means receiving the output of said sample and hold circuit and said second train of pulses and effecting counter starting counts corresponding to said reference azimuth when one of said second pulses and the time corresponding one of the binary bits from said sample and hold circuit are binarily opposite, said logic means effecting a counter starting count corresponding to said reference azimuth plus 180° when the said second pulse and the time corresponding one of said bits from said sample and hold circuit are binarily similar.

6. A system as defined in claim 5 wherein said counter start logic comprises a first AND gate receiving said second pulse and the output from said sample and hold circuits, an output from said first AND gate being connected to said counter and effecting a count starting at said reference azimuth, a second AND gate signal inverting means, means directly applying one of second pulse and sample and hold output signal to said second AND gate and the other of said signals through said inverting means to said second AND gate, said second AND gate developing an output for application to said counter to effect a counter start from a count corresponding to said reference azimuth plus 180°.

7. A system as defined in claim 1 wherein said counter stop logic means comprises a two stage shift register receiving said bit stream as an input to a first stage thereof, the output of said delay means being connected to said bit register to effect an advance thereof in time correspondence to the occurrence of said first pulses, comparator means receiving the output from each of the stages of said register and developing said third pulse in response to the outputs from said shift register stages being binarily similar.

8. A system as defined in claim 1 comprising a second reference azimuth 180° from the first reference azimuth, means for additionally generating one of said second pulses in time correspondence with the rotation of said antennas through the first one of said predetermined rotational increments subsequent to said second reference azimuth, a further switching means operatively connected to and positioned in accordance with the rotation of said antennas, said further switching means being connected between the output of said bit generating means and said counter start logic means and counter stop logic means, said further switching means being adapted in a first position thereof to effect connection of said bit stream to said logic circuitry and in a second position thereof to invert said bit stream prior to application to said logic circuitry, said first switch position being effected during the first 180° rotational segment of said antennas beyond said first reference azimuth and said second switching position being extended during the 180° rotational segment of said antennas beyond said second reference azimuth.

9. A system as defined in claim 8 further comprising a counter display device and a readout means connected between said counter and said display device, said readout means being responsive to said counter stop pulses to effect a readout of the count within said counter to said display for the duration of the subsequent one of said count sequences.

No references cited.

RODNEY D. BENNETT, *Acting Primary Examiner.*

CHESTER L. JUSTUS, *Examiner.*

C. E. WANDS, *Assistant Examiner.*